US008715556B2

(12) United States Patent
Murakami et al.

(10) Patent No.: US 8,715,556 B2
(45) Date of Patent: May 6, 2014

(54) GAS TURBINE ENGINE BLADE FOR AIRCRAFT AND MANUFACTURING METHOD THEREOF

(75) Inventors: Tsutomu Murakami, Tokorozawa (JP); Hideo Morita, Yokohama (JP); Takahiro Ogi, Tokyo (JP); Ikuo Okumura, Takasaki (JP); Katsuyoshi Moriya, Takasaki (JP)

(73) Assignees: IHI Corporation (JP); IHI Aerospace Co., Ltd. (JP)

( * ) Notice: Subject to any disclaimer, the term of this patent is extended or adjusted under 35 U.S.C. 154(b) by 510 days.

(21) Appl. No.: 12/934,339

(22) PCT Filed: Mar. 27, 2009

(86) PCT No.: PCT/JP2009/056357
§ 371 (c)(1),
(2), (4) Date: Sep. 24, 2010

(87) PCT Pub. No.: WO2009/119830
PCT Pub. Date: Oct. 1, 2009

(65) Prior Publication Data
US 2011/0020130 A1  Jan. 27, 2011

(30) Foreign Application Priority Data
Mar. 28, 2008 (JP) .................................. 2008-088628

(51) Int. Cl.
*B23P 15/02* (2006.01)
(52) U.S. Cl.
USPC ......... 264/258; 264/294; 264/324; 416/229 R

(58) Field of Classification Search
USPC .......... 415/192, 200; 416/229 A, 229 R, 230, 416/241 A; 264/258, 294, 324
See application file for complete search history.

(56) References Cited

U.S. PATENT DOCUMENTS

| 3,892,612 A | * | 7/1975 | Carlson et al. ................. 156/150 |
| 3,942,231 A | * | 3/1976 | Whitaker ....................... 29/889.7 |
| 5,279,892 A | | 1/1994 | Baldwin et al. ............... 428/232 |
| 5,375,978 A | | 12/1994 | Evans et al. |

(Continued)

FOREIGN PATENT DOCUMENTS

| CN | 1237230 A | 12/1999 |
| EP | 1 092 529 | 4/2001 |

(Continued)

OTHER PUBLICATIONS

Japanese Office Action, dated Sep. 11, 2012, issued in corresponding Japanese Application No. 2010-505861. English translation included. Total 5 pages.

(Continued)

*Primary Examiner* — Nathaniel Wiehe
*Assistant Examiner* — Woody A Lee, Jr.
(74) *Attorney, Agent, or Firm* — Ostrolenk Faber LLP

(57) ABSTRACT

A gas turbine engine blade for aircraft which has a 3-dimensional blade surface shape twisted around a center line at an angle of 45 degrees or more and 70 degrees or less, wherein the aforementioned blade is provided with multiple composite material prepregs which contain reinforced fiber and which are integrally molded after being laminated in the thickness direction, and the aforementioned reinforced fiber runs continuously without interruption within each layer of the aforementioned composite material prepregs.

3 Claims, 5 Drawing Sheets

(56) References Cited

U.S. PATENT DOCUMENTS

| | | | |
|---|---|---|---|
| 6,290,895 B1 * | 9/2001 | Wang et al. | 264/510 |
| 6,843,565 B2 | 1/2005 | Evans et al. | |
| 2004/0021828 A1 | 2/2004 | Evans et al. | 353/28 |
| 2011/0027098 A1 * | 2/2011 | Noe et al. | 416/241 B |

FOREIGN PATENT DOCUMENTS

| | | |
|---|---|---|
| JP | 50-014095 | 2/1975 |
| JP | 60-018319 | 1/1985 |
| JP | 03-061515 | 3/1991 |
| JP | 11-350904 | 12/1999 |
| JP | 2001-129844 A | 5/2001 |
| JP | 2003-254298 | 9/2003 |
| JP | 2004-285864 | 10/2004 |
| JP | 2004-353666 A | 12/2004 |
| JP | 2005-035287 | 2/2005 |
| JP | 2005-113908 | 4/2005 |
| JP | 2005-313321 A | 11/2005 |
| JP | 2007-261141 | 10/2007 |
| JP | 2008-45010 A | 2/2008 |
| SU | 1827982 | 5/1995 |

OTHER PUBLICATIONS

Chinese Office Action, dated Sep. 13, 2012, issued in corresponding Chinese Application No. 200980117987.2. English translation included. Total 12 pages.

Russian Federation Decision on Grant, dated Apr. 27, 2012, issued in corresponding Russian Patent Application No. 2010143596/06(062787), filed Mar. 27, 2009. Total 8 pages.

Search Report dated Jul. 27, 2012 issued in corresponding European Patent Application No. 09725734.9-2307 (7 pages).

F C Campbell "Manufacturing processes for advanced composites, Chapter 10 (Thermoplastic Composites: An Unfulfilled Promise)"; Elsevier Advanced Technology, Oxford, GB, pp. 357-397 (2004) XP-002615944.

International Search Report dated Jul. 7, 2009, issued in corresponding international application No. PCT/JP2009/056357.

Japanese Notice of Allowance, dated Nov. 26, 2013, issued in corresponding Japanese Patent Application No. 2012-248753. Total 6 pages, including English Translation.

* cited by examiner

GAS TURBINE ENGINE BLADE FOR AIRCRAFT AND MANUFACTURING METHOD THEREOF

CROSS REFERENCE TO RELATED APPLICATIONS

The present application is a 35 U.S.C. §371 National Phase conversion of PCT/JP2009/056357, filed Mar. 27, 2009, which claims benefit of Japanese Application No. 2008-088628, filed Mar. 28, 2008, the disclosure of which is incorporated herein by reference. The PCT International Application was published in the Japanese language.

TECHNICAL FIELD

The present invention relates to a gas turbine engine blade for aircraft and a manufacturing method thereof.

BACKGROUND ART

In conventional fan blades of composite material used in gas turbine engines for aircraft, prepregs with matrixes of thermohardening resin are used (see, e.g., Patent Document 1).

When manufacturing fan blades composed of such composite material, planar prepregs divided into multiple layers are first subjected to direct lamination in the thickness direction of a curved surface shape obtained by laser light commands to produce a blade surface shape. This is then subjected to heat and pressure in an autoclave, and integrally molded.

On the other hand, in the case of blades with relatively small torsion around a center line such as gas turbine engine stator blades for aircraft, integral molding into a blade surface shape is conducted by putting prepregs having matrixes of sheet-like thermoplastic resin into a pair of dies in a laminated state, and applying heat and pressure (see, e.g., Patent Document 2).

Patent Document 1: U.S. Pat. No. 5,375,978
Patent Document 2: Japanese Unexamined Patent Application, First Publication No. 2003- 254298
Patent Document 3: U.S. Pat. No. 6,843,565

DISCLOSURE OF INVENTION

Problems that the Invention is to Solve

However, with respect to the method recorded in the aforementioned Patent Document 1, as thermohardening composite material is used, in order to achieve suitable quality, it is necessary to directly laminate the prepregs onto the die surface so as to obtain the desired blade surface shape. In the case of a relatively thick part such as a fan blade for gas turbine engines used in aircraft, not only is the number of laminations enormous, but it is also necessary to conduct fine in-plane division of each layer in order to form a 3-dimensional curved surface shape. In order to laminate these in-plane divided prepregs at the correct positions on a 3-dimensional curved surface, the aid of a laser or the like is required, and operations are extremely complex (see, e.g., Patent Document 3).

Due to the foregoing reasons, the method recorded in the aforementioned Patent Document 1 requires an enormous amount of working time, and is costly. Moreover, with respect to the thermohardening composite material, the usage limit and storage temperature range are stringent, and material management is troublesome. In addition, due to the in-plane division of each layer of prepreg, discontinuities arise in the reinforced fiber at the boundaries.

On the other hand, with respect to the method recorded in Patent Document 2, although integral molding may be conducted using prepreg composite material with a matrix of thermoplastic resin, in the case of relatively thick blades with large torsion around a center line such as fan blades, fiber meander and voids tend to occur when the laminate obtained by planar lamination of prepregs is put into a die. Consequently, it is difficult to conduct molding into the appropriate shape.

The present invention was made in light of the foregoing circumstances, and its object is to offer a gas turbine engine blade for aircraft enabling molding to be easily conducted even when it is thick and has a blade shape with large torsion around a center line, and a manufacturing method thereof suited to mass production.

Means for Solving the Problems

The present invention adopts the following means in order to solve the aforementioned problems.

The gas turbine engine blade for aircraft pertaining to a first invention is a gas turbine engine blade for aircraft which has a 3-dimensional blade surface shape twisted around a center line at an angle of 45 degrees or more and 70 degrees or less, wherein the aforementioned blade is provided with multiple composite material prepregs which contain reinforced fiber, and which are integrally molded after being laminated in the thickness direction, and the aforementioned reinforced fiber runs continuously without interruption within each layer of the aforementioned composite material prepregs.

By laminating the aforementioned composite material prepregs in a desired number of layers at desired positions, this invention is able to regulate the thickness of a blade piece. Moreover, by having the aforementioned reinforced fiber run continuously without interruption within each layer of the aforementioned composite material prepregs, it is possible to prevent interruptions in the aforementioned reinforced fiber within each layer, and reductions in the strength of the part.

It is also acceptable to use thermoplastic resin as the matrixes of the aforementioned composite material prepregs.

It is also acceptable to dispose thermoplastic resin film between the aforementioned composite material prepregs.

By disposing thermoplastic resin film between the aforementioned prepregs, it is possible to inhibit occurrence of delamination.

As thermoplastic composite material can be remelted even once it has hardened, this invention enables application of heat and pressure in a second molding step and a third molding step even after application of heat and pressure in a first molding step, and it is possible to obtain an integrated gas turbine engine blade for aircraft without boundary surfaces between the blade pieces.

A manufacturing method of gas turbine engine blades for aircraft pertaining to a second invention includes: a lamination step in which multiple composite material prepregs containing reinforced fiber and having thermoplastic resin as their matrixes are formed into a laminate by laminating the prepregs onto a planar surface in the thickness direction; a first molding step in which the aforementioned laminate is subjected to heat and pressure, and molded tabular shape is again subjected to heat and pressure, and moled into a blade piece with a 3-dimensional curved surface shape; and a third molding step in which a plurality of the aforementioned blade pieces are superimposed, and subsequently integrated by application of heat and pressure to obtain a 3-dimensional blade surface shape.

In this invention, the molding process is divided into the three steps of a first molding step, a second molding step, and a third molding step. In the first molding step, as the aforementioned laminate is molded into a tabular shape, it is sufficient in the lamination step which is the preceding step if the aforementioned composite material prepregs of planar shape are laminated onto a planar surface, and there is no need to conduct lamination into a complex 3-dimensional curved surface shape, nor to conduct fine, in-plane division of each layer. Moreover, as lamination operations pertaining to the aforementioned composite material prepregs of planar shape are easier than lamination operations pertaining to blade pieces molded into a 3-dimensional curved surface shape, it is possible to minimize molding error with respect to the blade surface shape.

Accordingly, it is possible to easily and rapidly conduct lamination operations, and also to avoid discontinuities of the reinforced fiber within each layer. That is, the aforementioned reinforced fiber runs continuously without interruption within each layer of the aforementioned composite material prepregs. Moreover, as division is conducted into relatively thin blade pieces until the second molding step even with a relatively thick part such as a fan blade, a 3-dimensional shape can be imparted with ease and high precision. Furthermore, as it is possible to execute the division of each blade piece in parallel until the second molding step, this manufacturing method is suited to mass production.

With the manufacturing method of gas turbine engine blades for aircraft pertaining to the present invention, in the second molding step, the aforementioned multiple blade pieces may be respectively molded into a 3-dimensional curved surface shape which is formed when the gas turbine engine blade for aircraft is multiply divided in the thickness direction.

This invention enables easy conduct of the molding operations that impart the final product shape in the second molding step and third molding step.

With the manufacturing method of gas turbine engine blades for aircraft pertaining to the present invention, in the aforementioned lamination step of the aforementioned manufacturing method, the aforementioned composite material prepregs may be laminated at positions corresponding to the thickness of the aforementioned blade pieces and in a number of layers corresponding to the thickness of the aforementioned blade pieces so as to form the laminate.

Effects of the Invention

According to the present invention, it is possible to easily conduct molding even with blade shapes which are thick and which have large torsion around the center line.

Figure 1:
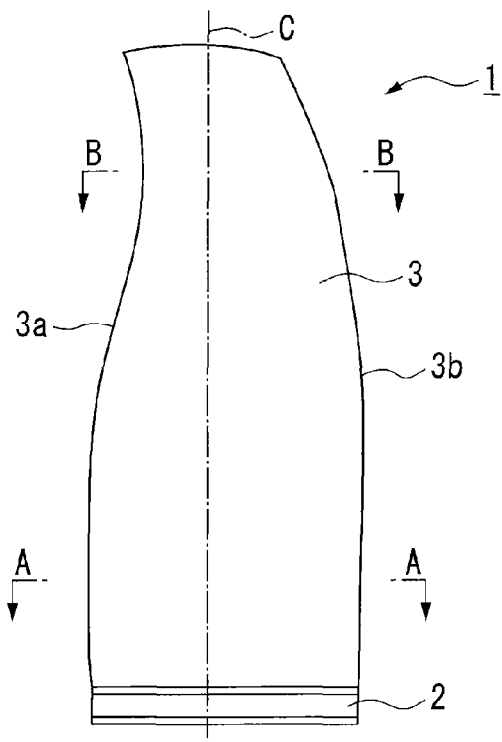
FIG. 1 is a side view which shows a fan blade pertaining to one embodiment of the present invention.
Figure 2:
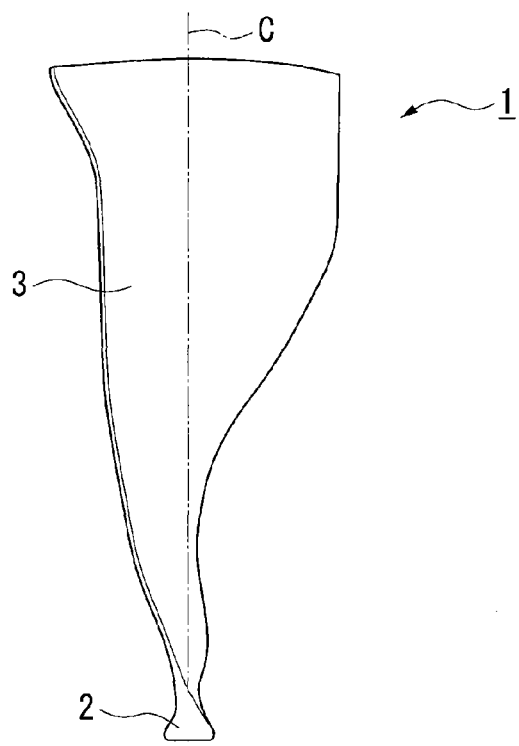
FIG. 2 is a front view which shows a fan blade pertaining to one embodiment of the present invention.
Figure 3:
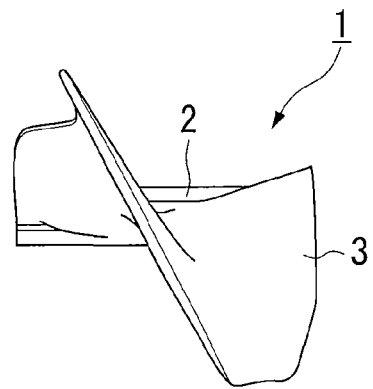
FIG. 3 is a plan view which shows a fan blade pertaining to one embodiment of the present invention.
Figure 4:
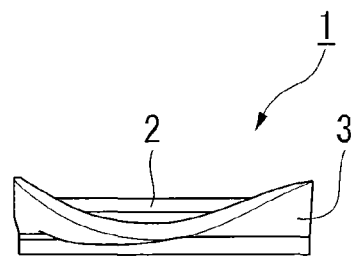
FIG. 4 is a sectional view along line A-A of FIG. 1.
Figure 5:
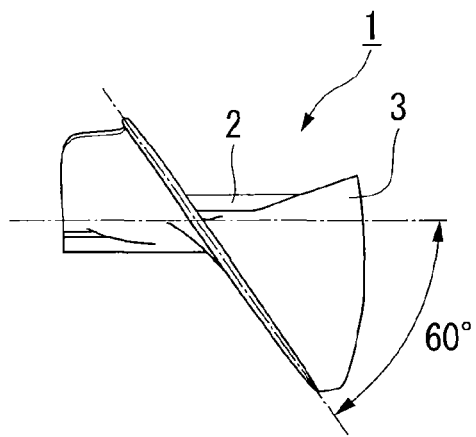
FIG. 5 is a sectional view along line B-B of FIG. 1.
Figure 6:
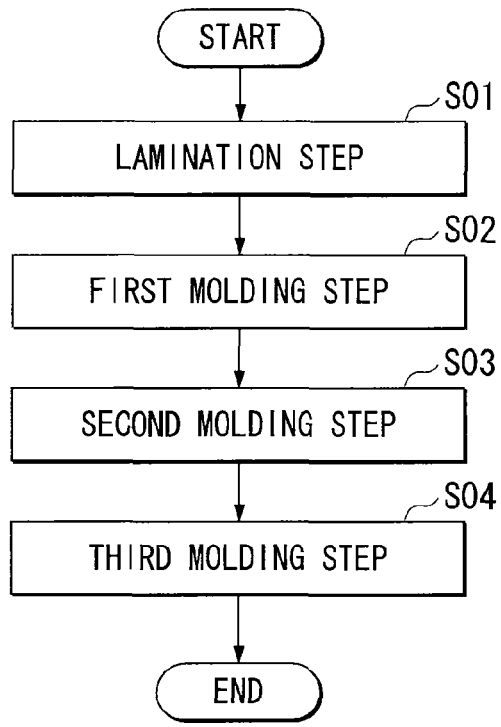
FIG. 6 is a flowchart which shows a manufacturing method of a fan blade pertaining to one embodiment of the present invention.

BRIEF DESCRIPTION OF THE REFERENCE NUMERALS 1 fan blade (blade)
10A-10L sheet material
11 laminate (plate)
12A-12D blade pieces

BEST MODE FOR CARRYING OUT THE INVENTION

One embodiment of the present invention will now be described with reference to FIG. 1 to FIG. 9.

As shown in FIG. 1 to FIG. 5, a fan blade (gas turbine engine blade for aircraft) 1 of the present embodiment is provided with a base part 2 which engages with a disk (not illustrated in the drawings), and a blade part 3 which extends from the base part 2. The blade part 3 is curved into a prescribed airfoil from a front edge 3a to a rear edge 3b, and has a 3-dimensional blade surface shape which is twisted at an angle of approximately 60 degrees around a center line C.

As described below, with respect to this fan blade 1, multiple prepregs (composite material prepregs) 10A-10L are laminated onto a planar surface, and a tabular shape is molded, after which blade pieces 12A-12D that have undergone deformation molding into a 3-dimensional curved surface shape are also integrally molded.

Next, a manufacturing method of the fan blade 1 pertaining to the present embodiment is described in detail.

The manufacturing method of the fan blade 1 pertaining to the present embodiment is a method which is particularly well suited to a fan blade 1 having a 3-dimensional blade surface shape that is twisted at an angle of 45 degrees or more and 70 degrees or less around the center line C.

As shown in FIG. 6 to FIG. 9, this manufacturing method includes: a lamination step (S01) which forms a laminate 11 by laminating multiple prepregs 10A-10L onto a planar surface in a thickness direction D; a first molding step (S02) which molds the laminate 11 into a tabular shape by applying heat and pressure; a second molding step (S03) which applies heat and pressure to the aforementioned laminate 11 that has been molded into a tabular shape, and deforms it into a blade piece 12A-12D of a 3-dimensional curved surface shape; and a third molding step (S04) which superimposes the multiple blade pieces 12A-12D that have been formed, and applies heat and pressure to integrate them.

As the blade pieces 12A-12D are molded by the same operations in the lamination step (S01), first molding step (S02), and second molding step (S03), blade piece 12A is described in these steps unless otherwise noted.

Figure 7:
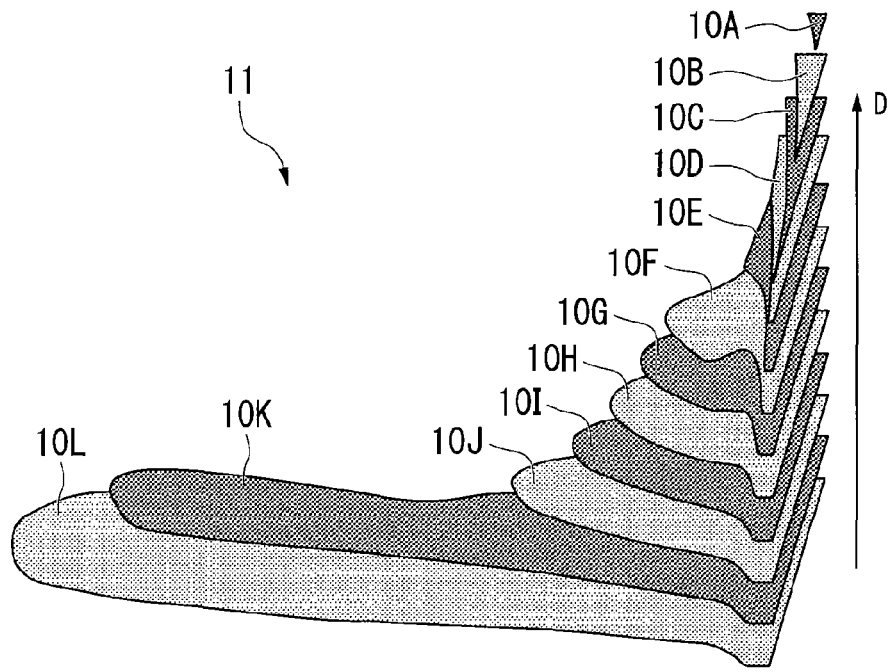
FIG. 7 is an explanatory view which shows a laminate in a manufacturing method of a fan blade pertaining to one embodiment of the present invention.

In the lamination step (S01), planar prepregs 10A-10L are laminated in the thickness direction D. Here, in the prepregs 10A-10L, for example, thermoplastic matrix resin sheets containing carbon fiber (reinforced fiber) with a prescribed degree of orientation is used. As shown in FIG. 7, the respective prepregs 10A-10L have different sizes. The laminate 11 is then formed according to the thickness of the molded blade piece 12A by laminating prepregs of the desired sizes at the desired positions in the desired number of layers.

In the first molding step (S02), the aforementioned laminate 11 is disposed in a die (not illustrated in the drawings), the aforementioned die is heated to a prescribed temperature, and a prescribed pressure is applied. At this time, the prepregs 10A-10L soften, the laminate 11 is integrated by fusion of the boundary surfaces, and a tabular part is formed.

Figure 8:
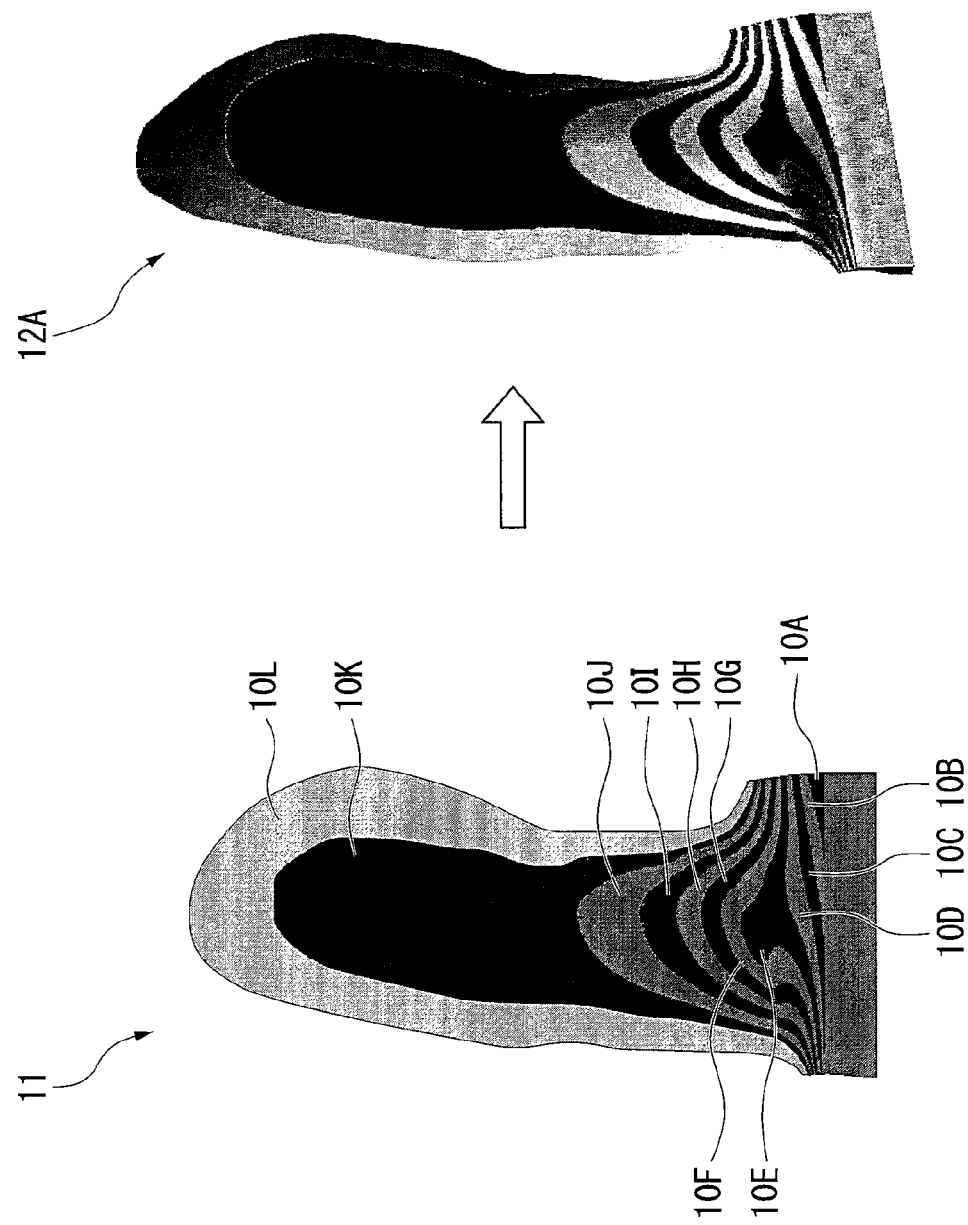
FIG. 8 is an explanatory view which shows a state where a blade piece is molded from a laminate in a manufacturing method of a fan blade pertaining to one embodiment of the present invention.

In the second molding step (S03), the aforementioned tabular part is disposed in a die (not illustrated in the drawings) of 3-dimensional shape, the aforementioned die is heated to a prescribed temperature, and a prescribed pressure is applied. At this time, each layer within the tabular part softens, and a blade piece 12A with a 3-dimensional curved surface shape is formed by the movement and interlayer displacement of the fiber within the layers, as shown in FIG. 8. The other blade pieces 12B, 12C, and 12D are also formed by the same operations.

Here, the respective blade pieces 12A-12D are molded into the 3-dimensional curved surface shapes that are formed when the fan blade 1 is multiply divided in the thickness direction. Consequently, in the lamination step (S01), the size, lamination position, and number of layers of the prepregs 10A-10L vary by blade piece. In addition, the aforementioned dies used in the second molding step (S03) also respectively conform to the 3-dimensional curved surface shapes to be obtained. The 3-dimensional curved surface shapes of the blade pieces 12A-12D obtained in this manner constitute a 3-dimensional curved surface shape that is twisted at an angle of approximately 60 degrees around a center line C.

In the third molding step (S04), the blade pieces 12A-12D molded into their respectively prescribed 3-dimensional curved surface shapes are superimposed, and disposed within a die (not illustrated in the drawings). At this time, care is taken to avoid any error in lamination order so that the desired 3-dimensional curved surface shape is obtained by laminating the blade pieces 12A-12D.

Figure 9:
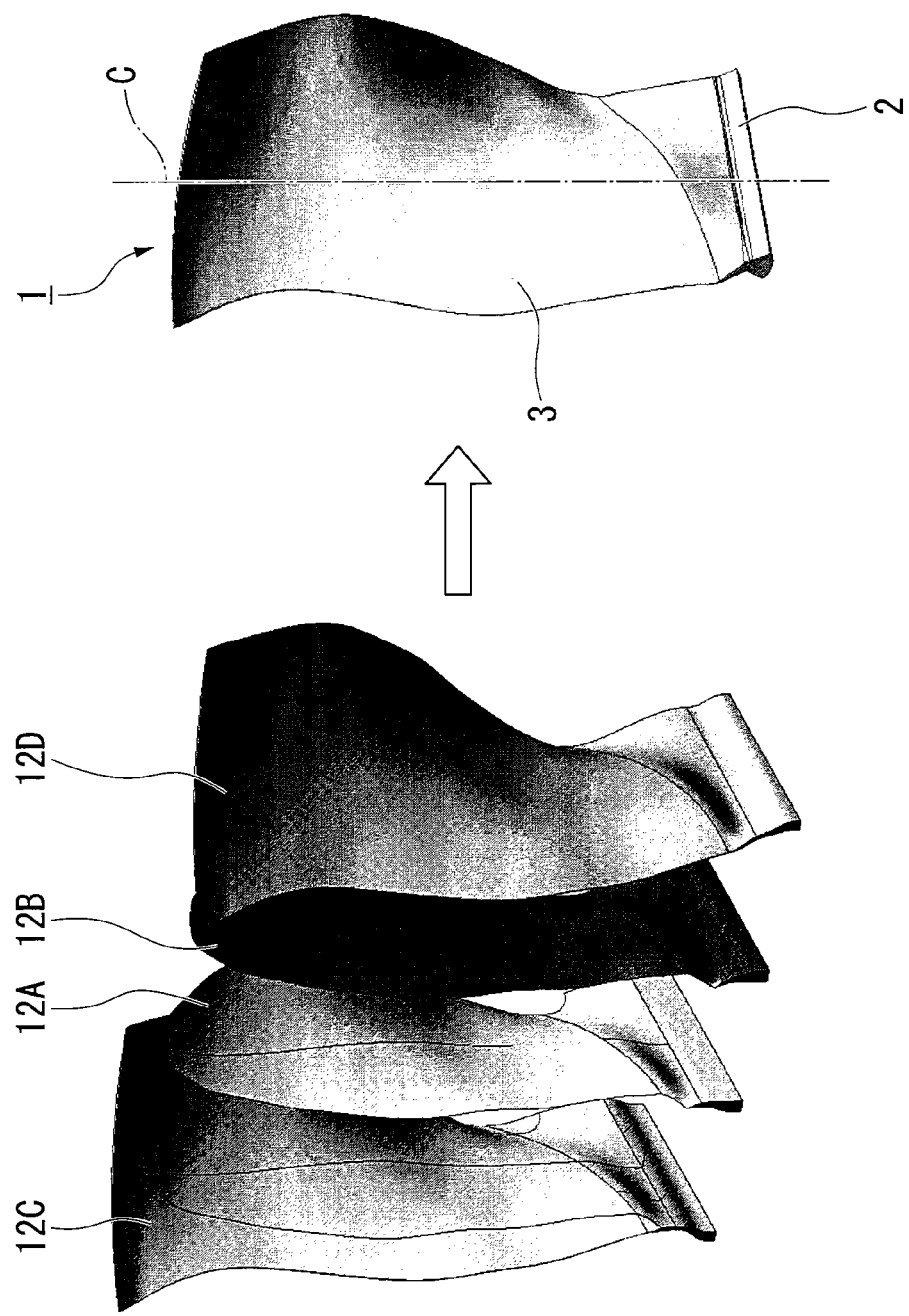
FIG. 9 is an explanatory view which shows a fan blade molded by laminating blade pieces in a manufacturing method of a fan blade pertaining to one embodiment of the present invention.

Next, this die is heated to a prescribed temperature, and a prescribed pressure is applied. At this time, since the blade pieces 12A-12D soften and fuse at the boundary surfaces thereof, an integrated fan blade 1 is obtained as shown in FIG. 9.

According to this fan blade 1 and this manufacturing method, the molding process is divided into the three steps of a first molding step (S02), second molding step (S03), and third molding step (S04). In the first molding step (S02), as the aforementioned laminate 11 is molded into a tabular shape, it is sufficient in the lamination step (S01) which is the preceding step if lamination is conducted onto a planar surface, and there is no need for lamination into a complex 3-dimensional curved surface shape, and no need to conduct fine in-plane division of each layer.

Accordingly, lamination operations can be conducted easily and rapidly.

Moreover, even a relatively thick part such as a fan blade is divided into relatively thin blade pieces until the second molding step (S03), a 3-dimensional shape can be imparted with ease and high precision. As a result, molding can be easily conducted even with a fan blade 1 that is thick and large, and that has large torsion.

In particular, as the blade pieces 12A-12D are respectively molded into 3-dimensional curved surface shapes that are formed when the fan blade 1 is multiply divided in the thickness direction, the molding operations for each blade pieces in the third molding step (S04) can be easily conducted.

Moreover, in the lamination step (S01), as the prepregs 10A-10L are laminated at the desired positions in the desired number of layers according to the thickness of the blade piece 12A, it is possible to optimally adjust the thickness of the blade piece 12A by the prepregs 10A-10L.

In addition, as the prepregs 10A-10L are thermoplastic matrix resin sheets containing carbon fiber, they can be remelted even once they have hardened. Accordingly, application of heat and pressure is possible in a second molding step (S03) and a third molding step (S04) even after application of heat and pressure in the first molding step (S02). Therefore, it is possible to obtain an integrated fan blade 1 without boundary surfaces between the blade pieces 12A-12D.

Otherwise, the technical scope of the present invention is not limited by the aforementioned embodiment, and various modifications can be made without departing from the scope of the present invention.

For example, the size and number of layers of the prepregs and the blade pieces are not limited by this embodiment, and may be appropriately determined according to the thickness, size, and shape of the fan blade. There is also no need to limit the torsion of the fan blade to 60 degrees.

Furthermore, the applications of the fan blade of the present invention are not limited to gas turbine engines for aircraft, and may also be applied to other gas turbine engine blades.

INDUSTRIAL APPLICABILITY

According to the present invention, molding can be easily conducted even with thick blade shapes that have large torsion around a center line.

What is claimed is:

1. A manufacturing method of gas turbine engine blades comprising:
    a lamination step in which multiple composite material prepregs containing reinforced fiber and having thermoplastic resin as their matrixes are formed into a laminate by laminating the prepregs onto a planar surface in the thickness direction;
    a first molding step in which said laminate is subjected to heat and pressure, and molded into a tabular shape;
    a second molding step in which said laminate molded into a tabular shape is again subjected to heat and pressure, and molded into a blade piece with a 3-dimensional curved surface shape;
    and a third molding step in which a plurality of said blade pieces are superimposed, and subsequently integrated by application of heat and pressure to obtain a 3-dimensional blade surface shape.

2. The manufacturing method of gas turbine engine blades according to claim 1 wherein said multiple blade pieces are respectively molded into a 3-dimensional curved surface shape which is formed when the gas turbine engine blade is multiply divided in the thickness direction.

3. The manufacturing method of gas turbine engine blades according to claim 2 wherein, in said lamination step, said composite material prepregs are laminated at positions corresponding to the thickness of said blade pieces and in a number of layers corresponding to the thickness of said blade pieces so as to form the laminate.

* * * * *

UNITED STATES PATENT AND TRADEMARK OFFICE
CERTIFICATE OF CORRECTION

PATENT NO.        : 8,715,556 B2
APPLICATION NO.   : 12/934339
DATED             : May 6, 2014
INVENTOR(S)       : Murakami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this
Twenty-ninth Day of September, 2015

Michelle K. Lee
*Director of the United States Patent and Trademark Office*